United States Patent [19]

Gane et al.

[11] Patent Number: 4,854,971
[45] Date of Patent: Aug. 8, 1989

[54] CLAY COMPOSITION

[75] Inventors: Patrick A. C. Gane, Callington; Graham P. O'Neill, Bodmin, both of United Kingdom

[73] Assignee: E.C.C. International Limited, Great Britain

[21] Appl. No.: 127,178

[22] Filed: Dec. 1, 1987

[30] Foreign Application Priority Data

Dec. 2, 1986 [GB] United Kingdom ............... 8628807

[51] Int. Cl.$^4$ ....................... C04B 14/10; C04B 33/04
[52] U.S. Cl. ........................... 106/286.5; 106/187.11; 106/467; 106/486; 501/145; 423/118; 162/181.6; 162/181.8
[58] Field of Search ................. 501/145; 106/288 B, 106/291, 287.17, 286.5; 423/118; 162/181.6, 181.8

[56] References Cited

U.S. PATENT DOCUMENTS

| 4,017,324 | 4/1977 | Eggers | 106/288 B |
| 4,076,548 | 2/1978 | Bundy et al. | 106/288 B |
| 4,188,456 | 2/1980 | Patel | 428/537 |

FOREIGN PATENT DOCUMENTS

| 0110036A | 6/1984 | European Pat. Off. |
| 970579 | 9/1964 | United Kingdom . |
| 2017072A | 10/1979 | United Kingdom . |

OTHER PUBLICATIONS

Hackh's Chem. Dictionary, 4th Edition, pp. 70, 83.
McGraw-Hill's "Encyclopedia of Science", pp. 160–167.
"Clay Mineralogy", 2d Ed., Ralph E. Grim, pp. 189 & 192 Kirk-Othmer's Concise Encyclopedia of Chemical Technology pp. 772–773.

*Primary Examiner*—Mark L. Bell
*Attorney, Agent, or Firm*—Klauber & Jackson

[57] ABSTRACT

There is disclosed a method for improving the rheological properties of a clay mineral which, when dispersed with water, either releases into solution or retains on its surface multivalent cations, which method includes the step of treating the clay mineral in aqueous suspension with an aluminosiliceous material having a cation exchange capacity of at least 50 meq/100 g, said aluminosiliceous material being employed in an amount sufficient to react with a significant proportion of the exchangeable cations in the clay mineral. Also disclosed is an aqueous suspension of a clay mineral, a method for preparing a paper coating composition and a method for improving the rheological properties of a clay mineral.

21 Claims, No Drawings

CLAY COMPOSITION

BACKGROUND OF THE INVENTION

This invention relates to a method of improving the rheological properties of clays, more especially kaolin clays, in water, to a pigment composition for use in aqueous dispersions, for example in paper coating compositions, and to a method of preparing an aqueous suspension containing from about 60% to about 75% by weight of a clay mineral and having improved rheological properties.

Many varieties of coated papers are produced today. They are principally coated with a composition, sometimes known as the coating colour, which essentially comprises an adhesive, also known as a binder, and a pigment. A discussion of the constituents of paper coating compositions and of the methods of applying such compositions to paper is given in Chapter XIX, Volume III, of the 2nd Edition of the book by James P. Casey entitled "Pulp and Paper: Chemistry and Technology". The adhesive used can be, for example, starch, casein or a synthetic resin latex; the particular adhesive used will depend, for example, on the printing process to be used, e.g. offset lithography requires the adhesive to be water-insoluble. Generally, the pigment will consist of clay together with an amount, which may be up to 60% by weight, of one or more other constituents, for example, calcium carbonate, calcium sulphate, lithopone, barium sulphate, titanium pigments, talc or satin white.

In certain procedures for preparing kaolin clay for use in industry, especially for use in paper coating compositions, and in particular in those procedures which are commonly adopted in the United States of America, the raw kaolin clay is subjected, in aqueous suspension, to various particle size separations. The thus beneficiated fine kaolin product is separated from the water by filtration and the filter cake redispersed in water to form a more concentrated suspension containing from about 50% to about 60% by weight of dry clay. At this stage two alternative methods are available to produce a final suspension which is suitable for transport and storage. In the first method the suspension containing 50–60% by weight of dry clay is spray dried and the spray dried product redispersed in water containing a dispersing agent to provide a suspension containing around 70% by weight of dry clay. In general a final suspension prepared by this method is found to have acceptable rheological properties under conditions of high shear. In the second method, however, the suspension containing 50–60% by weight of dry clay is not spray dried but instead is mixed with sufficient previously spray dried clay to increase the solids content to around 70% by weight. The final suspension prepared by this method generally tends to exhibit a higher viscosity under conditions of high shear than an equivalent suspension prepared by the first method. The present invention provides a way of overcoming the disadvantage of the second method.

DESCRIPTION OF THE PRIOR ART

It has been discovered that certain raw kaolinitic clays, when subjected to purification and particle size separation to yield a product suitable for use as a pigment in a paper coating composition, give poor results when a paper coating composition containing the clay product is coated onto a base using modern highspeed coating apparatus, for example a trailing blade coater. Such clays tend to give a coating which, instead of being smooth, level and continuous, is marred by streaks, stipples and other defects, and it is known that defects of this type are generally due to the high viscosity of the coating composition under high rates of shear.

EP-No. 0110036 A (Georgia Kaolin) discloses a method of processing naturally occurring kaolin clay in which ion exchange resins are employed to remove charged soluble impurities from the clay. This technique suffers from the disadvantage that the ion exchange resin must be separated from the clay after treatment if the clay is to be used as a paper grade pigment.

SUMMARY OF THE INVENTION

According to a first aspect of the present invention, there is provided a method for improving the rheological properties of a clay mineral which, when dispersed with water, either releases into solution or retains on its surface multivalent cations, which method includes the step of treating the clay mineral in aqueous suspension with a an aluminosiliceaous material having a cation exchange capacity of a least 50 meq/100 g, said aluminosiliceous material being employed in an amount sufficient to react with a significant proportion of the exchangeable cations in the clay mineral.

According to a second aspect of the present invention, there is provided an aqueous suspension of a clay mineral which, when dispersed in water, either releases into solution or retains on its surface multivalent cations, and an amount of an aluminosiliceous material having a cation exchange capacity of at least 50 meq/100 g sufficient to react with a significant proportion of the exchangeable cations in the clay mineral.

According to a third aspect of the present invention, there is provided a method for preparing a paper coating composition having improved rheological properties which method comprises:

treating, in aqueous suspension, a clay mineral which, when dispersed in water, either releases into solution or retains on its surface multivalent cations with an amount of an aluminosiliceous material having a cation exchange capacity of at least 50 meq/100 g sufficient to react with a significant proportion of the exchangeable cations in the clay mineral; and admixing an aqueous suspension of the treated kaolin clay pigment with an adhesive.

According to a fourth aspect of the present invention there is provided a method for improving the rheological properties of a clay mineral which, when dispersed in water, either releases into solution or retains on its surface multivalent cations, which method includes the steps of blending a clay mineral having a solids content in the range of about 50% to about 60% by weight of solids with a spray dried clay mineral to increase the solids content to within the range of from about 60% to about 75% by weight of solids, and adding to the blend an aluminosiliceous material having a cation exchange capacity of at least 50 meg/100 g, said aluminosiliceous material being employed in an amount sufficient to react with a significant proportion of the exchangeable cations in the clay mineral.

The aluminosiliceous material is preferably used in an amount of at least 0.1% by weight, based on the weight of dry kaolin clay. Preferably, no more than 2.0% by weight of the aluminosiliceous material should be used since greater than 2.0% may affect adversely the properties of the clay mineral.

The aluminosiliceous material preferably has a cation exchange capacity of at least 200 meq/100 g, most preferably 500 meq/100 g.

The method of the present invention has been found to be particularly suitable where the clay mineral is a kaolin clay. Hereafter, references to kaolin clay should not be construed as limiting the present invention to the treatment of kaolin clays only.

DESCRIPTION OF THE PREFERRED EMBODIMENTS

The present invention is based on the discovery that one of the causes of poor high shear rheological properties in a paper coating composition containing a kaolin clay as the or one of the pigments is a relatively high content of water-soluble compounds containing multivalent cations, in particular calcium, magnesium, iron and aluminium, closely associated with the kaolin. Paper coating compositions generally contain the minimum quantity of water consistent with a fluidity which is just sufficient to enable the composition to spread over the surface of the paper. In such concentrated suspensions a dispersing agent must be provided for the kaolin. The dispersing agents generally used are alkali metal or ammonium condensed phosphate salts, for example sodium hexametaphosphate or tetrasodium pyrophosphate, or polyelectrolytes such as alkali metal or ammonium salts of poly(acrylic acid) or poly (methacrylic acid). Any multivalent cations which are present in the suspension tend to form complexes with dispersing agents of these types, thus reducing their effectiveness in maintaining the suspended particles of kaolin in a fully dispersed condition.

The aluminosiliceous material may be natural or synthetic and may be, for example, a smectite clay, for example bentonite, montmorillonite, hectorite, saponite or fullers earth, or, more preferably, a zeolite, Smectite clays generally have a cation exchange capacity in the range of from 50 to 150 meq/100 g but zeolites may have cation exchange capacities in excess of 200 meq/100 g and up to about 600 meq/100 g. Examples of suitable zeolites are synthetic faujasites (zeolites X and Y) and the natural zeolites clinoptilolite, phillipsite and mordenite and an alkali metal ion exchanged form of chabazite. Especially preferred is zeolite 4A which generally has a cation exchange capacity in the region of 500 meq/100 g. If zeolite A is used as the aluminosiliceous material the amount required is generally smaller and will generally be in the range of 0.1 to 0.5% by weight. The cation exchange capacity of kaolin clays themselves is most commonly in the range from 5 to 15 meq/100 g.

A zeolite 4A may be synthesised from a gel comprising sources of oxides of aluminium, silicon and sodium, but may also be prepared by treating metakaolin produced by calcining a kaolinitic clay with a sodium hydroxide solution under the conditions described, for example, in British Patent Specification No. 1603084.

It has been found to be advantageous to use a finely divided zeolite having an average particle diameter in the range of from 1 to 4 micron. A zeolite 4A formed from metakaolin according to the process of British Patent Specification No. 1603084 will generally have an average particle diameter within this range but a synthetic zeolite may have to be comminuted to give a finely divided product having the desired average particle diameter.

The aluminosiliceous material is preferably mixed with the kaolin clay before, or at the same time as, the dispersing agent is added. One of the advantages of the present invention, particularly when the aluminosiliceous material is a zeolite, is that it is not essential to separate the clay from the aluminosiliceous material after treatment therewith. It is, however, within the scope of the present invention to remove the aluminosiliceous material by means of, for example, a sieve, before the kaolin is contacted with the dispersing agent. Alternatively, the kaolin suspension could be passed through a column which was packed with zeolite granules and which ensured good mixing.

The dispersing agent is preferably a polyelectrolyte such as, for example, an alkali metal or ammonium salt of a poly(acrylic acid) or of a derivative of a poly(acrylic acid) and the quantity required is generally in the range of from 0.05 to 1.0% by weight, based on the weight of dry kaolin clay.

The invention is illustrated by the following Examples.

EXAMPLE 1

A paper coating grade kaolin was prepared by subjecting an aqueous suspension of a raw kaolinitic clay to particle size separations to give a final product having a particle size distribution such that 80% by weight consisted of particles having an equivalent spherical diameter smaller than 2 microns and 0.02% by weight consisted of particles having an equivalent spherical diameter larger than 10 microns. The final product was found by chemical analysis to contain 70 ppm (parts by weight per million parts by weight of dry kaolin) of water-soluble calcium and 18 ppm of water-soluble magnesium.

Suspension A

An aqueous suspension was prepared containing 68.6% by weight of the dry kaolin product, sufficient sodium hydroxide to raise the pH of the suspension to 7.5 and 0.3% by weight, based on the weight of dry kaolin, of a sodium polyacrylate dispersing agent having a number average molecular weight of 1680.

Suspension B

A second suspension of the dry kaolin was prepared as described above except that 0.2% by weight, based on the weight of dry kaolin, of a zeolite 4A having an average particle diameter of 2 microns and a cation exchange capacity of 550 meq/100 g was mixed with the kaolin before the dispersing agent was added.

Each of the two suspensions prepared as described above was used to form a paper coating composition suitable for a coated offset printing paper according to the following formulation:

| Parts by weight of dry solids in each ingredient | Ingredient |
| --- | --- |
| 100 | suspension A or B. |
| 11 | styrene-butadiene rubber latex adhesive (approx. 50% by weight of solids latex) |
| 0.6 | sodium carboxymethylcellulose |

The paper coating of dry solids compositions were made up with water to about 62% by weight and sodium hydroxide to pH 8.5.

The high shear viscosity of each paper coating composition was measured at a shear rate of $12840s^{-1}$ by means of a Ferranti-Shirley viscometer.

The results obtained are set forth in Table 1 below:

TABLE 1

| | % by weight of dry of solids | pH | Viscosity at $12840s^{-1}$ shear rate (mPa.s) |
|---|---|---|---|
| With zeolite 4A | 61.9 | 8.4 | 1032 |
| Without Zeolite 4A | 62.2 | 8.5 | too high to measure |

Each of the two paper coating compositions was coated on to an offset printing base paper having a substance weight of 86 gm$^{-2}$ and a caliper of 100 microns using a "HELI-COATER" (Registered Trade Mark) laboratory paper coater of the type described in British Patent Specification No. 1032536 rotating at a speed of 400 rpm.

Samples of paper coated with each of the two compositions were dried and inspected visually. The paper coated with the composition which did not contain the zeolite 4A was seen to have a surface which was severely marred by pitting and streaking while the paper coated with the composition containing the zeolite 4A had a surface which was substantially completely free from pitting and streaking.

EXAMPLE 2

Two offset paper coating compositions, C and D, were prepared according to the method described in Example 1.

Composition C contained as the pigment the paper coating grade kaolin of Example 1 untreated with zeolite 4A.

Composition D contained as the pigment the same paper coating grade kaolin as used in Example 1, but which had been treated by contacting an aqueous suspension of the kaolin with zeolite 4A granules which were removed after treatment of the kaolin by means of a sieve. This treatment procedure was then repeated using a second batch of fresh zeolite 4A granules, following which the dispersing agent was added.

Each paper coating composition was tested for high shear viscosity by means of the Ferranti-Shirley viscometer at a shear rate of $12840s^{-1}$.

The results obtained are set forth in Table 2 below:

TABLE 2

| Composition | Viscosity at $12840s^{-1}$ shear rate (mPa.s) |
|---|---|
| C | too high to measure |
| D | 1050 |

EXAMPLE 3

Further suspensions of the same paper coating grade kaolin as used in Example 1 were prepared by the method described in Example 1, but containing differing amounts of a bentonite clay having a cation exchange capacity of 97 meq/100 g, instead of zeolite 4A.

Each suspension was used to form an offset paper coating composition as described in Example 1 and the high shear viscosity of each composition was measured at a shear rate of $12840s^{-1}$ by means of the Ferranti-Shirley viscometer.

Samples of coated paper were then prepared with each composition using the same base paper and experimental method as used in Example 1. After drying each sample was inspected visually.

The results obtained are set forth in Table 3 below:

TABLE 3

| % by weight bentonite based on weight of dry kaoline | % by weight of dry solids | pH | Viscosity at $12840s^{-1}$ shear rate (mPa.s) | Appearance of coating |
|---|---|---|---|---|
| 0 | 62.2 | 8.5 | too high to measure | severely streaked and stippled |
| 0.1 | 62.4 | 8.5 | 6328 | streaked and stippled |
| 0.25 | 62.1 | 8.5 | 5255 | some streaking and stippling |
| 0.5 | 62.1 | 8.6 | 4691 | some very fine stippling |

EXAMPLE 4

Kaolin slurries which contained 70% by weight of beneficiated kaolins, Kaolin A and Kaolin B were prepared in each case by blending an aqueous suspension containing 55% by weight of the beneficiated kaolin with sufficient of a particulate material which was formed by spray drying a suspension of the same beneficiated kaolin to increase the solids content to 70% by weight.

Kaolin A was a paper coating grade kaolin having a particle size distribution such that 94% by weight consisted of particles having an equivalent spherical diameter smaller than 2 microns and 84% by weight consisted of particles having an equivalent spherical diameter smaller than 1 micron.

Kaolin B was a paper coating grade kaolin having a particle size distribution such that 93% by weight consisted of particles having an equivalent spherical diameter smaller than 2 microns and 75% by weight consisted of particles having an equivalent spherical diameter smaller than 1 micron.

Samples taken from each of the two slurries were treated with varying quantities of zeolite 4A having a cation exchange capacity of 500 meq/100 g by adding the zeolite in the form of a dry powder to the sample of suspension and stirring the mixture for 3 minutes. Samples of each mixture were withdrawn and the viscosity of the sample was measured by means of :

(a) a Brookfield Viscometer at a spindle speed of 100 rpm and (b) a Hercules Viscometer and the results obtained are set forth in Table 4 below:

TABLE 4

| % by weight of zeolite 4A(based on weight of dry Kaolin) | Kaolin A | | Kaolin B | |
|---|---|---|---|---|
| | Brookfield Viscosity (m Pa.s) | Hercules Viscosity (rpm for full scale deflection) | Brookfield Viscosity (m Pa.s) | Hercules Viscosity (rpm for full scale deflection) |
| 0 | 430 | 950 | 230 | 1940 |
| 0.25 | 430 | 1120 | 240 | 2200 |

TABLE 4-continued

| % by weight of zeolite 4A(based on weight of dry Kaolin) | Kaolin A | | Kaolin B | |
| --- | --- | --- | --- | --- |
| | Brookfield Viscosity (m Pa.s) | Hercules Viscosity (rpm for full scale deflection) | Brookfield Viscosity (m Pa.s) | Hercules Viscosity (rpm for full scale deflection) |
| 0.5 | 410 | 1380 | 260 | 2440 |
| 1.0 | 500 | 1560 | 300 | 2440 |

It is to be noted that a full scale deflection on the Hercules Viscometer represents a measured torque of $18 \times 10^5$ dyne cm. For a given rate of shear (measured in rpm) a higher scale reading represents a higher viscosity and the viscosity generally increases with the rate of shear. It can therefore by seen that the high shear viscosity of both slurries decreases with increasing dose of zeolite 4A, although the low shear viscosity, as measured with the Brookfield Viscometer, tends to increase with zeolite dose.

What we claim is:

1. A method for improving the rheological properties of a kaolin clay which, when dispersed with water, either releases into solution or retains on its surface multivalent cations, which method includes the step of treating the kaolin clay in aqueous suspension with a zeolite having a cation exchange capacity of at least 50 meq/100 g, said zeolite being employed in an amount of at least 0.1% by weight, based on the weight of dry kaolin clay.

2. A method according to claim 1, wherein the zeolite is used in an amount no greater than 2.0% by weight, based on the weight of dry kaolin clay.

3. A method according to claim 1, wherein the zeolite is zeolite A.

4. A method according to claim 3, wherein the zeolite A is used in an amount of at least 0.1% by weight, based on the weight of dry kaolin clay.

5. A method according to claim 3, wherein the zeolite A is used in an amount no greater than 0.5% by weight, based on the weight of dry kaolin clay.

6. A method according to claim 1, wherein the zeolite has an average particle diameter in the range of from 1 to 4 microns.

7. A method according to claim 1, wherein the zeolite has a cation exchange capacity of at least 200 meq/100 g.

8. A method according to claim 1, wherein the zeolite has a cation exchange capacity of at least 500 meg/100 g.

9. A method according to claim 1, wherein the kaolin clay is additionally treated with a dispersing agent.

10. A method according to claim 9, wherein the kaolin clay is treated with the dispersing agent at the same time as, or after, treatment with the zeolite 11. A method according to claim 9, wherein the dispersing agent is selected from the group consisting of polyelectrolytes, alkali metal condensed phosphate salts or ammonium condensed phosphate salts.

12. A method according to claim 9, wherein the dispersing agent used is in an amount of from 0.05% to 1.0% by weight, based on the weight of dry kaolin clay.

13. A method according to claim 1, wherein the kaolin clay is separated from the zeolite after treatment therewith.

14. A method according to claim 1, wherein the aqueous suspension of clay is contacted with beads of the zeolite in a packed column.

15. An aqueous suspension of a kaolin clay which, when dispersed in water, either releases into solution or retains on its surface multivalent cations, and at least 0.1% by weight, based on the weight of dry kaolin clay of a zeolite having a cation exchange capacity of at least 50 meq/100 g 16. An aqueous suspension according to claim 15, wherein the zeolite is used in an amount no greater than 2.0% by weight, based on the weight of dry kaolin clay.

17. An aqueous suspension according to claim 15, wherein the amount of kaolin clay in the suspension is in the range of from 40% to 80% by weight of the suspension.

18. An aqueous suspension according to claim 15, further comprising a dispersing agent.

19. An aqueous suspension according to claim 15, which has a pH of about 7.5.

20. A method for preparing a paper coating composition having improved rheological properties which method comprises:

treating, in aqueous suspension, a kaolin clay which, when dispersed in water, either releases into solution or retains on its surface multivalent cations with at least 0.1% by weight, based on the weight of dry kaolin clay, of a zeolite having a cation exchange capacity of at least 50 meq/100 g; and admixing an aqueous suspension of the treated clay with an adhesive.

21. A method for improving the rheological properties of a kaolin clay which, when dispersed in water, either releases into solution or retains on its surface multivalent cations, which method includes the steps of blending a kaolin clay having a solids content in the range of about 50% to about 60% by weight of solids with a spray dried kaolin clay to increase the solids content to within the range of from about 60% to about 75% by weight of solids, and adding to the blend a zeolite having a cation exchange capacity of at least 50 meq/100 g, said zeolite being employed in an amount of at least 0.1% by weight, based on the weight of dry kaolin clay.

* * * * *